(12) United States Patent
Arakawa

(10) Patent No.: US 7,472,881 B2
(45) Date of Patent: Jan. 6, 2009

(54) ARTICLE HANGING SYSTEM, SLIDABLE WIRE HOLDER, DETACHABLE WIRE HOLDER, WIRE HOOK AND WIRE GRIPPER

(75) Inventor: Hideo Arakawa, Tokyo (JP)

(73) Assignee: A.G.K. Ltd., Tokorozawa-Shi (JP)

( * ) Notice: Subject to any disclaimer, the term of this patent is extended or adjusted under 35 U.S.C. 154(b) by 0 days.

(21) Appl. No.: 11/674,058

(22) Filed: Feb. 12, 2007

(65) Prior Publication Data

US 2007/0125015 A1    Jun. 7, 2007

Related U.S. Application Data

(62) Division of application No. 11/427,596, filed on Jun. 29, 2006, which is a division of application No. 10/843,959, filed on May 11, 2004, now Pat. No. 7,316,380.

(30) Foreign Application Priority Data

May 15, 2003  (JP)  ............................ 2003-137008
Apr. 8, 2004  (JP)  ............................ 2004-113740

(51) Int. Cl.
*F16M 11/00*    (2006.01)

(52) U.S. Cl. ..................... 248/690; 248/307; 248/317; 248/339; 24/601.6; 24/136 A; 211/94.01; 254/264

(58) Field of Classification Search ................ 248/690, 248/692, 307, 317, 323, 328, 304, 305, 306, 248/339; 24/136 A, 601.6, 698.1, 598.4; 211/94.01; 340/568.8; 403/321, 322.1; 254/4 R, 254/47, 264; 414/462, 593
See application file for complete search history.

(56) References Cited

U.S. PATENT DOCUMENTS 1,534,879  A  *  4/1925  Stewart  ................... 294/82.23

(Continued)

FOREIGN PATENT DOCUMENTS

DE          44 35 985 A1       5/1995

(Continued)

OTHER PUBLICATIONS

Related U.S. Appl. No. 11/674,044, filed Feb. 12, 2007; Inventor: Hideo Arakawa.

(Continued)

*Primary Examiner*—J. Allen Shriver
*Assistant Examiner*—Todd M. Epps
(74) *Attorney, Agent, or Firm*—Frishauf, Holtz, Goodman & Chick, P.C.

(57) ABSTRACT

An article hanging system capable of easily changing an exhibit position and an exhibit height of an article such as a goods exhibited in a shop, a hanger and a display shelf comprises a ceiling rail assembly, a wire holder slidably retained to the ceiling rail assembly, a wire hanging down from the wire holder, a gripper fixably attachable at a desired position along the wire, a wire holder attached to a lower end of the wire and a floor rail assembly to which the wire holder is slidably retained. Each of the rail assemblies comprises longitudinal rails extending in a longitudinal direction (the Y-direction) and lateral rails slidable with respect to the longitudinal rail as being spanned between the longitudinal rails. Each of the wire holders are slidable along the lateral rail.

6 Claims, 12 Drawing Sheets

U.S. PATENT DOCUMENTS

| | | | | |
|---|---|---|---|---|
| 2,833,017 A | * | 5/1958 | Patton | 294/82.19 |
| 3,990,665 A | | 11/1976 | Joussemet | |
| 4,656,698 A | * | 4/1987 | Arakawa | 24/136 A |
| 4,736,855 A | * | 4/1988 | Arakawa | 211/94.01 |
| 5,058,847 A | * | 10/1991 | Arakawa | 248/328 |
| 5,165,647 A | | 11/1992 | Ribeiro | |
| 5,405,117 A | | 4/1995 | Davis | |
| 5,417,400 A | * | 5/1995 | Arakawa | 248/323 |
| 5,499,432 A | * | 3/1996 | Terada et al. | 24/599.2 |
| 5,638,049 A | * | 6/1997 | Arakawa | 340/568.8 |
| 5,810,457 A | | 9/1998 | Felsenthal et al. | |
| 6,058,656 A | | 5/2000 | Bischof et al. | |
| 6,401,312 B1 | * | 6/2002 | Wang | 24/600.6 |

FOREIGN PATENT DOCUMENTS

| | | |
|---|---|---|
| DE | 195 15 994 A1 | 11/1996 |
| JP | 11-037134 | 2/1999 |
| JP | 11-113702 A | 4/1999 |
| JP | 2000-041827 | 2/2000 |

OTHER PUBLICATIONS

Related U.S. Appl. No. 11/674,050, filed Feb. 12, 2007; Inventor: Hideo Arakawa.

* cited by examiner

*FIG. 9A* *FIG. 9B*
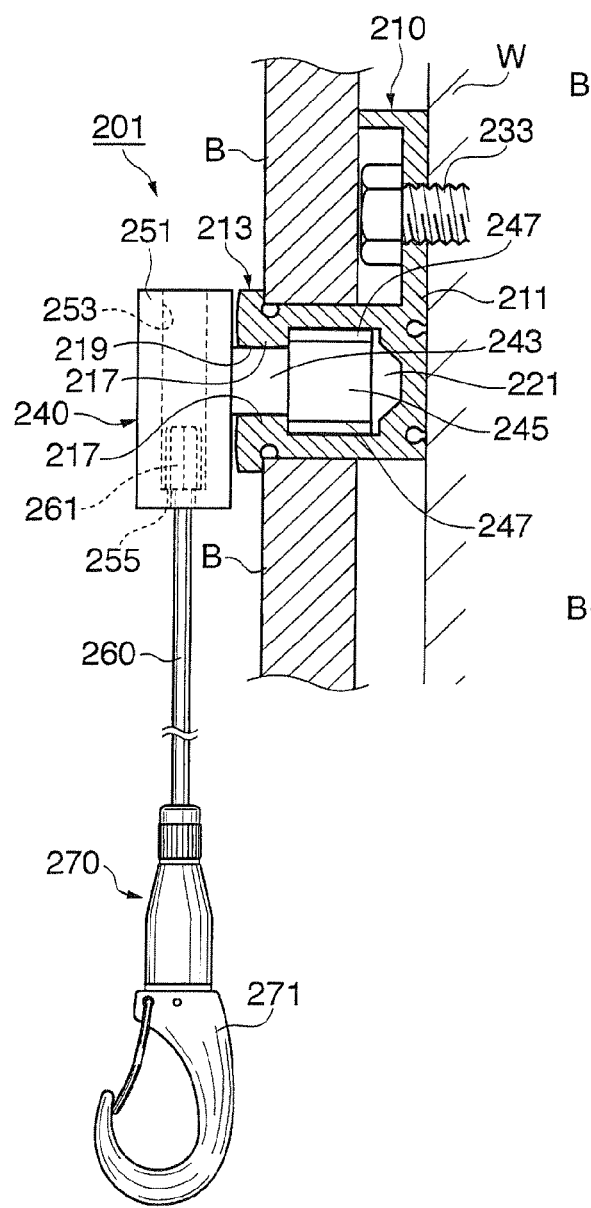
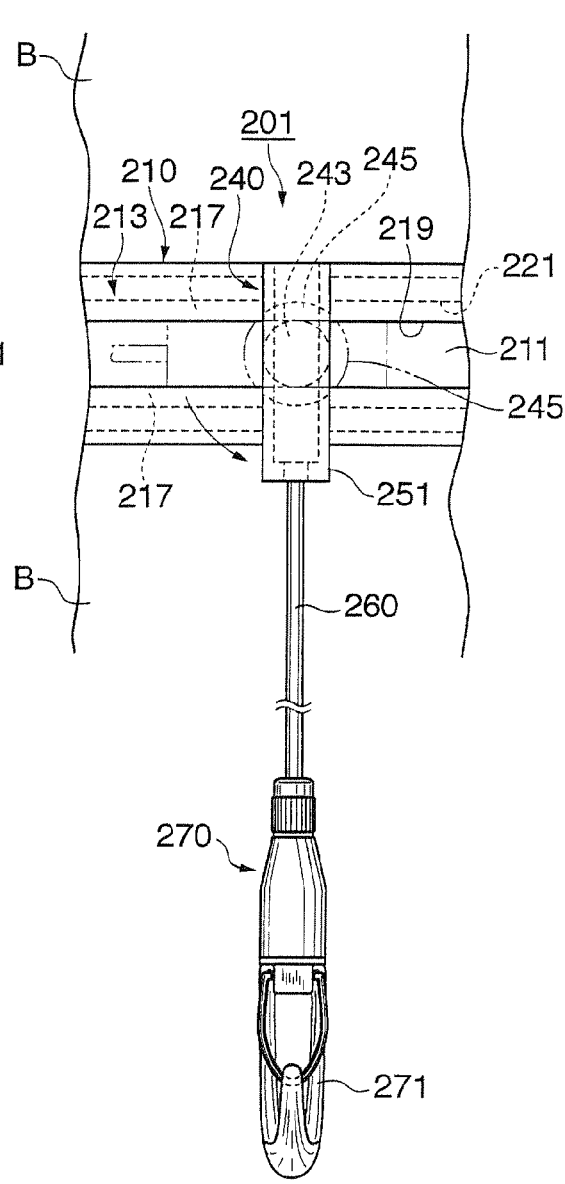

ARTICLE HANGING SYSTEM, SLIDABLE WIRE HOLDER, DETACHABLE WIRE HOLDER, WIRE HOOK AND WIRE GRIPPER

CROSS-REFERENCE TO RELATED APPLICATION

The present application is a Divisional Application of U.S. application Ser. No. 11/427,596, filed Jun. 29, 2006, which is a Divisional Application of U.S. application Ser. No. 10/843,959, filed May 11, 2004 now U.S. Pat. No. 7,316,380.

FIELD OF THE INVENTION

The present invention relates to an article hanging system for use in a display space such as a shop window, which is capable of hanging an article such as a goods exhibited in a shop, a hanger and a display shelf at a desired position. And, it further relates to components which constitute the article hanging system, such as a wire holder for slidably and detachably holding a wire to a rail, a wire hook for hooking a wire to the wire holder and a wire gripper for gripping an article at a desired position (height) along a wire.

BACKGROUND OF THE INVENTION

In a display space such as a shop window, various types of goods are exhibited by hanging on hangers or by setting on display shelves. Goods are arranged on hangers or display shelves so as to attract interest of pedestrians.

Conventionally, in such a display space, an arrangement of the goods is not changed for a predetermined period once the goods are arranged, because it is hard to alter positions and heights of the display shelves and the hangers. Consequentially, a change in the arrangement of the goods in a short cycle will attract more interest of pedestrians.

SUMMARY OF THE INVENTION

In order to solve the above-mentioned problems, an object of the present invention is to provide an article hanging system capable of easily changing an exhibit position and an exhibit height of an article such as a goods exhibited in a shop, a hanger and a display shelf. And, another object of the present invention is to provide components which constitute the article hanging system, such as various types of wire hangers, wire hooks and wire grippers.

An article hanging system according to the present invention comprises: a ceiling rail installed on a ceiling of a building; a wire holder slidably retained to said ceiling rail; a wire hanging down from said wire holder; and a gripper fixably attachable at a desired position along said wire, said gripper having an engagement portion with an article, wherein said ceiling rail comprising: a plurality of longitudinal rails extending in a direction (a longitudinal direction) and arranged on the ceiling; and a lateral rail slidable with respect to said longitudinal rails and spanned between said longitudinal rails, said wire holder is capable of sliding along said lateral rail.

In the present invention, it is preferable that the article hanging further comprises: a floor rail installed on a floor of a building; and a holder for holding a lower end of said wire, said holder slidable along said floor rail.

According to the present invention, an article can be exhibited at variable positions in a X-direction, a Y-direction and a Z-direction inside a three-dimensional space between the ceiling and the floor on which the longitudinal rail and the lateral rail are installed respectively, having a height equal to a length of the wire held from the ceiling. The exhibit position of the article in the X-Y plane can be easily changed by sliding the lateral rail with respect to the longitudinal rail or sliding the wire holder along the lateral rail. And, the exhibit height of the article in the Z-direction can be also easily changed by sliding the gripper along the wire. Accordingly, articles in a display space can be rearranged easily and quickly.

A slidable wire holder according to the present invention comprises: a slider slidable along a rail; and a wire hook attached to said slider; wherein said slider is provided with a body having an attachment portion at which said wire hook is attached, and, rollers assembled to said body so as to roll along the rail, wherein each of said rollers is composed of a first roller member and a second roller member, said first roller member being a single-piece having a flanged roller portion and an axis portion, said second roller member being a single-piece having a flanged roller portion and a sleeve portion, and said first roller member and said second roller member being assembled by fitting said axis portion of said first roller member into said sleeve portion of said second roller member.

According to the present invention, since each roller is made as a single-piece such that the axis portion is integrated with the roller portion, it becomes possible to raise a withstanding load about three times as large as that of a conventional roller constructed by a roller and a bearing.

A detachable wire holder according to the present invention comprises: a rail engagement member slidable along a rail and also detachable from the rail by rotating with respect to the rail by a predetermined angle; and a wire hook attached to said rail engagement member; wherein said rail engagement member comprises a shaft formed on one end thereof with an attachment portion for said wire hook, a head formed on another end of said shaft and engaged with a hollow engagement portion of the rail, and a rotation preventive portion formed under said head, and said rail engagement member further comprising: a locknut threadedly engaged with said shaft; a washer fitted onto said shaft and arranged between said locknut and said head; and a bias member which biases said washer toward said head, wherein said detachable wire holder assuming following three states:

a lock state where said locknut is threadedly advanced closer to said head onto said shaft so that the engagement portion of the rail will be tightly held between said head and said washer, whereby said rail engagement member is unslidably and undetachably held to the rail; a slidable state where said locknut is threadedly advanced away from said head onto said shaft for a predetermined distance, whereby said rail engagement member is slidably held to the rail and unrotatable with respect to said rail due to said rotation preventive portion; and a detachable state where said locknut is threadedly advanced further away from said head onto said shaft for a predetermined distance so that said rail engagement member will be allowed to rotate with respect to the rail, whereby said rail engagement member will be detached from the hollow engagement portion of the rail.

According to the present invention, the wire holder is slidable along the rail and fixable at a desired position therealong. Further, the wire holder is attachable and detachable at any position of the wire. In addition, the rotation preventive portion will prevent the wire holder from being detached off the rail accidentally.

A wire hook according to the present invention comprises: a sleeve member formed on one end thereof with a attachment portion at which another member is attached; a hook to which a wire is hooked, said hook being formed on another end of said sleeve member; and a slipping preventive member capable of opening and closing a space between a distal end of said hook and said sleeve member for preventing the wire from being slipped through the space; wherein said slipping preventive member is a V-shape lever, and biased outwardly like a spring by contacting with an outer surface of said sleeve member at proximal ends thereof, resulting in a pointed end of said slipping preventive member contacting with a distal end of said hook so as to close the space.

According to the present invention, accidental detachment of the wire from the wire hook can be prevented by a simple mechanism.

A wire gripper according to the present invention comprises: a gripper sleeve having a gripping mechanism fixably attachable at a desired position along a wire; a hook to which an article is hooked, said hook being coupled to said gripper sleeve; and a hook cover for closing a opening of said hook, said hook cover temporarily being locked to said gripper sleeve.

In the present invention, since a specified tool such as a hexagon wrench or a key is required for detachment of the hook cover from the gripper sleeve, it is difficult that an article hooked to the hook is detached therefrom easily, whereby a theft-proof gripper can be provided.

A wire gripper according to the present invention comprises: a gripper sleeve having a gripping mechanism fixably attachable at a desired position along a wire; and a hook to which an article is hooked, said hook being coupled to said gripper sleeve, said wire gripper further comprising: an outer ring mounted to a lower end of said gripper sleeve; an inner ring mounted to an upper end of said hook; and a bush arranged between said outer ring and said inner ring for holding said inner ring so as to rotate with respect to said outer ring, said bush made of a low-friction material.

In the present invention, when an article hooked to the gripper is so heavy that a load applied to the gripper is high, rotating the hook (which is mounted to the inner ring) with respect to the gripper (which is mounted to the outer ring) will cause the wire gripper to hold the article stably.

An article hanging system according to another embodiment of the present invention comprises: a rail installed on a wall or a ceiling of a building; a wire holder slidably retained to said rail; a wire hanging down from said wire holder; and a gripper fixably attachable at a desired position along said wire, said gripper having an engagement portion with an article; wherein said rail has a groove opened in a horizontal direction, a sliding portion of said wire holder being fitted therein, and said wire holder is slidably and detachably retained to said rail groove by engagement of the sliding portion thereof with said rail when said wire is strained downwardly, and said wire holder is detached from said rail groove by rotating said wire holder after said wire is loosened.

According to the present invention, the wire is strained downwardly due to a weight of an article hung by the wire. In other words, once an article is hung by the wire, it is hard to detach the wire holder from the rail, thus safe hanging is realized.

Here, the rail groove may be opened in a right horizontal direction or an obliquely horizontal direction.

In the present invention, it is preferable that said rail has the groove in which the sliding portion of said wire holder can be rotated, the rail groove being opened in a horizontal direction, said wire holder can be detached from said rail when said sliding portion thereof is so rotated in said rail groove that a longitudinal direction of said sliding portion is aligned with a longitudinal direction of said rail groove, and said wire holder cannot be detached from said rail when said sliding portion thereof is so rotated in said rail groove that a longitudinal direction of said sliding portion is aligned perpendicular to the longitudinal direction of said rail groove.

According to the present invention, since the sliding portion is formed as above described shape, a specified means is not required for retaining the wire holder to the rail undetachably but slidably. And, the wire holder can be easily attached and detached to the rail by a simple operation such as a rotation of the sliding portion thereof.

A wire holder according to another embodiment of the present invention comprises: a slider slidable along a rail and detachable from the rail by rotating with respect to the rail by a predetermined angle; and a wire hook attached to said slider; wherein said slider is provided with a sliding portion fitted into a groove of the rail, and a shaft portion coupled said sliding portion to said wire hook, said sliding portion having a length larger than a width of a opening of the rail groove and a width slightly shorter than the width of the opening of the rail groove, said sliding portion rotatable in said rail groove, said shaft portion has a diameter slightly smaller than the width of the opening of the rail groove, said shaft portion rotatable in said rail groove.

According to the present invention, an article hanging system capable of easily changing an exhibit position and an exhibit height of an article (for example, a goods exhibited in a shop, a hanger or a shelf) is provided. In addition, a wire holder capable of easily sliding along a rail as well as attaching and detaching to the rail, a wire hook having a detachment-proof mechanism, a wire gripper having a theft-proof mechanism or a rotating mechanism can be provided.

BRIEF DESCRIPTION OF THE DRAWINGS

FIG. 2 is a drawing showing the channel rail and the double-channel rail.

FIG. 3 is a drawing showing a shape of a slider of the T-shape holder.

FIG. 4 is a drawing showing a structure of a detachable wire holder.

FIG. 5 is a drawing showing a structure of a shaft of the wire holder of FIG. 4.

FIG. 6 is a drawing showing the wire hook.

FIG. 7 is a drawing showing the antitheft wire gripper.

FIG. 9 is a drawing showing another embodiment of an article hanging system according to the present invention, FIG. 9(A) is a cross-sectional side drawing of the article hanging system and FIG. 9(B) is an elevation drawing of the article hanging system.

FIG. 10 is a drawing showing the structure of the rail of the article hanging system of FIG. 9.

FIG. 11 is a drawing showing a structure of the wire holder.

DETAILED DESCRIPTION OF EMBODIMENT OF THE INVENTION

The preferred embodiments of the present invention will be described in detail with reference to the accompanying drawings.

Figure 1:
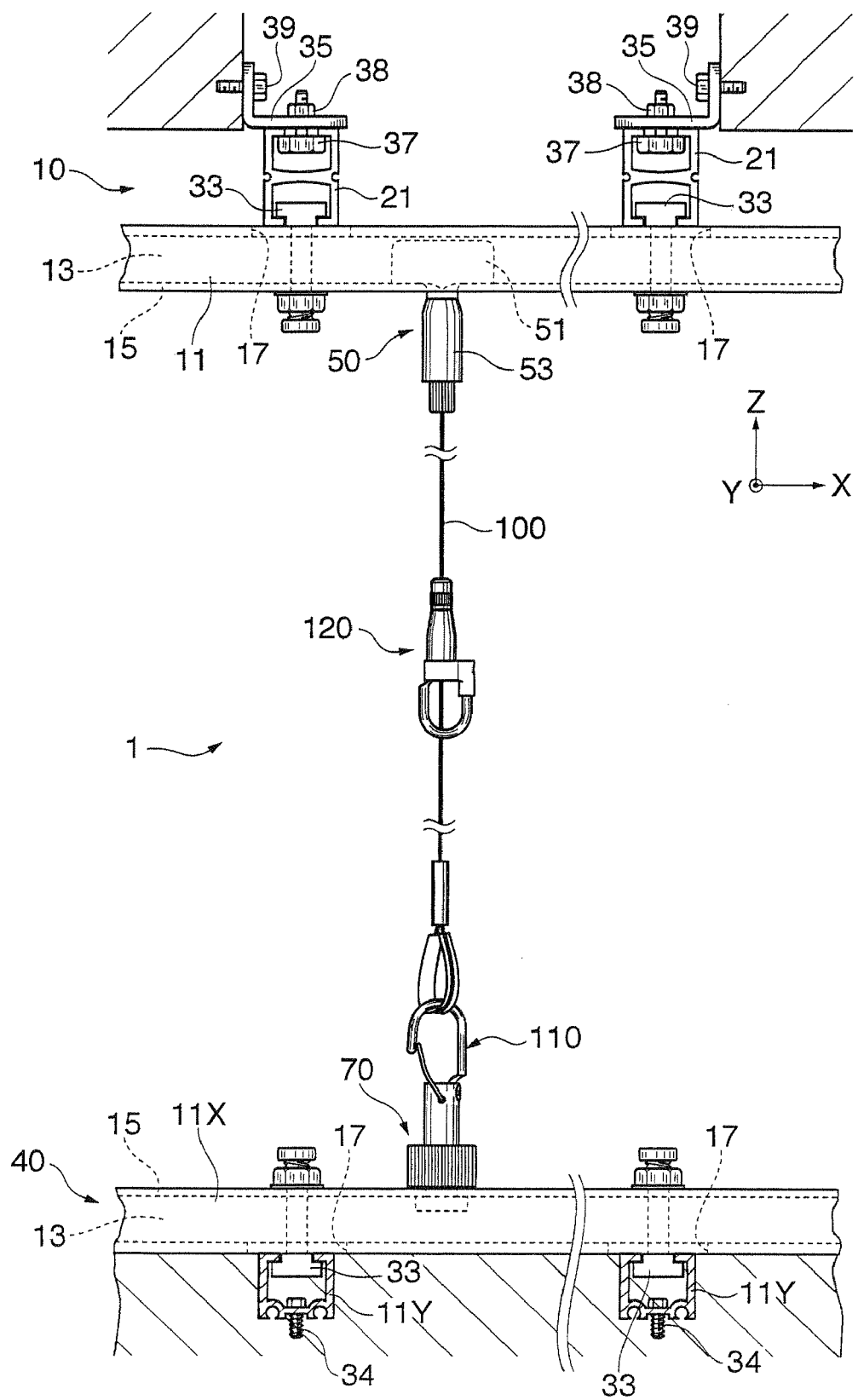
FIG. 1 is a drawing schematically showing an article hanging system according to the present invention.

FIG. 1 is a drawing schematically showing an article hanging system according to the present invention.

An article hanging system 1 according to this embodiment comprises a ceiling rail assembly 10 installed on a ceiling, a floor rail assembly 40 installed on a floor, a wire holder 50 retained to the ceiling rail assembly 10, a wire holder 70 retained to the floor rail assembly 40, a wire 100 held to the wire holders 50, 70 and extending between the wire holders 50, 70 and a gripper 120 to which an article is fixably attached at a desired position along the wire 100.

According to the invention, the article can be hung at variable positions in a X-direction, a Y-direction and a Z-direction inside a three-dimensional space between the ceiling on which the ceiling rail assembly 10 is installed and the floor on which the floor rail assembly 40 is installed.

First, the ceiling rail assembly 10 and the floor rail assembly 40 will be explained.

The ceiling rail assembly 10 according to this embodiment comprises a channel rail 11 extending in a lateral direction, two double-channel rails (H-shape rails) 21 extending in a longitudinal direction, an angle bracket 35 for installing the double-channel rail 21 on the ceiling and a rail connector 33 for connecting the channel rail 11 with the double-channel rail 21 installed on the ceiling.

In following descriptions, the longitudinal direction shows a Y-direction in figures, and the lateral direction shows a X-direction in figures.

The channel rail 11 and the double-channel rail 21 will be explained.

Figure 2A:
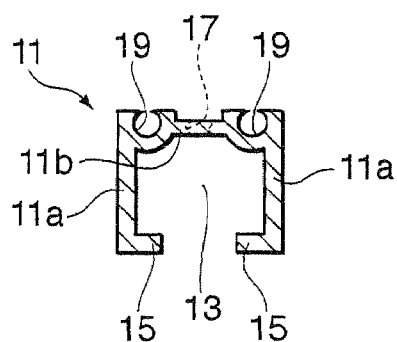
FIG. 2(A) is a cross-sectional drawing showing the channel rail and FIG. 2(B) is a cross-sectional drawing showing the double-channel rail.
Figure 2B:
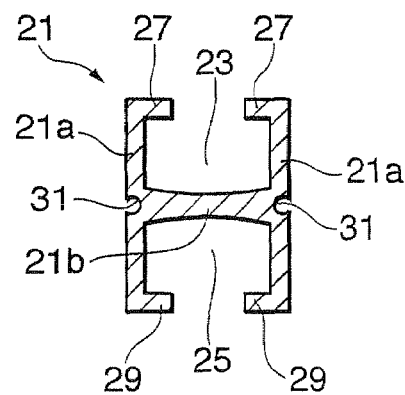

FIG. 2 is a drawing showing the channel rail and the double-channel rail, FIG. 2(A) is a cross-sectional drawing showing the channel rail and FIG. 2(B) is a cross-sectional drawing showing the double-channel rail.

As shown in FIG. 2(A), the channel rail 11 is provided with two sidewalls 11a and a back wall 11b. The sidewalls 11a and the back wall 11b form a groove (a hollow engagement portion) 13 in which the wire holder 50 is retained. The sidewalls 11a are formed on edges thereof with sliding engagement portions 15, which project to opposite directions each other. Between each sliding engagement portions 15, an opening is formed. The back wall 11b is formed with long holes 17 at specified intervals. The long holes 17 are for passing the rail connector 33 when the channel rail 11 will be connected to the double-channel rail 21.

The back wall 11b is formed with grooves 19 extending in the length direction of the channel rail 11, the grooves 19 having a cross section of a substantially circle. When the channel rails 11 will be adjoined in the length direction thereof, a connecting bar (like a long wire) is fitted into the groove 19 of each channel rail so that the channel rails 11 can be adjoined straightly in the length direction thereof.

As shown in FIG. 2(B), the double-channel rail 21 has a cross section of a H-letter, and is provided with two vertical sidewalls 21a and a partition wall 21b extending between centers of the vertical sidewalls 21a. Both faces of the partition wall 21b are concave inwardly. The vertical sidewalls 21a and the partition wall 21b form an upper groove (a hollow engagement portion) 23 and a lower groove (a hollow engagement portion) 25. The sidewalls 21a are formed on edges thereof with sliding engagement portions 27, 29 respectively, which project to opposite directions each other. Between each sliding engagement portions 27, 29, an opening is formed respectively.

The sidewalls 21a are formed with grooves 31 extending in the length direction of the rail 21, the grooves 31 having a cross section of a substantially circle respectively. When the rails 21 will be adjoined in the length direction thereof, a connecting bar is fitted into the groove 31 of each rail 21 so that the rails 21 can be adjoined straightly in the length direction thereof.

As shown in FIG. 1, the two double-channel rails 21 are arranged in the longitudinal direction (the Y-direction), and fixed to a beam of the ceiling by the angle bracket 35, which is fixed to the beam by a bolt 39 and coupled to the upper groove 23 of the double-channel rail 21 by a bolt 37 and a nut 38.

The channel rail 11 is spanned between the two double-channel rails 21 in the lateral direction (the X-direction), and is slidably connected to the double-channel rails 21 by rail connectors 33, which is passed through the long hole 17 of the channel rail 11 and engaged with the sliding engagement portion 29 of the double-channel rail 21, as shown in FIG. 1. Hereby, the channel rail 11 is connected to the double-channel rails 21 so as to slide in the longitudinal direction (the Y-direction) as being spanned between the two double-channel rails 21.

Next, the floor rail assembly 40 will be explained.

As shown in FIG. 1, the floor rail assembly 40 comprises two rails 11Y extending in the longitudinal direction (the Y-direction) and a channel rail 11X extending in the lateral direction (the X-direction). Each of the rails 11X, 11Y has a same structure as the channel rail 11 shown in FIG. 2(A) respectively.

The channel rails 11Y are installed on the floor by screws 34 in the longitudinal direction (the Y-direction).

The channel rail 11X is spanned between the two channel rails 11Y in the lateral direction (the Y-direction), and arranged in a same position in the X-direction and the Y-direction as that of the channel rail 11 of the ceiling rail assembly 10. The channel rail 11X is slidably connected to each rail 11Y by the rail connector 33, which is passed through the long hole 17 of the channel rail 11X and engaged with the sliding engagement portion 15 of the channel rail 11Y, as shown in FIG. 1. Hereby, the channel rail 11X is connected to the channel rails 11Y so as to slide in the longitudinal direction (the Y-direction) as being spanned between the two channel rails 11Y.

Next, the slide wire holder will be explained.

The slide wire holder is for holding the wire 100 to the channel rail 11 of each of the rail assemblies 10, 40 at a desired position therealong. As such holder, a T-shape holder 50 and a detachable holder 70 may be used (as described later in detail). The T-shape holder 50 is slidable along the channel rail 11 freely, but undetachable from the channel rail 11 neither temporarily fixable to the channel rail 11. On the other hand, the detachable holder 70 is detachable from the channel rail 11X as well as slidable along the channel rail 11X and temporarily fixable at a desired position along the channel rail 11X.

In the embodiment shown in FIG. 1, the T-shape holder 50 is retained to the ceiling rail assembly 10, and the detachable holder 70 is retained to the floor rail assembly 40.

First, the T-shape wire holder 50 will be explained.

Figure 3A:
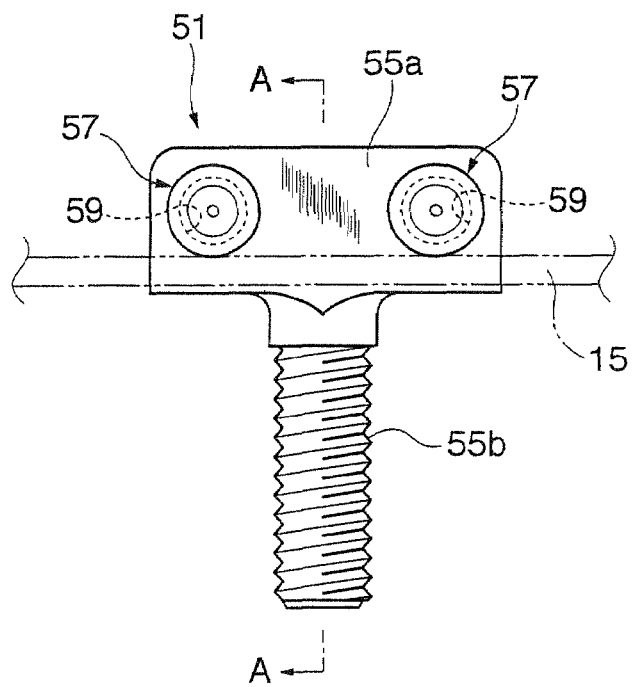
FIG. 3(A) is an elevation drawing of the slider and FIG. 3(B) is a side cross-sectional drawing of the slider.
Figure 3B:
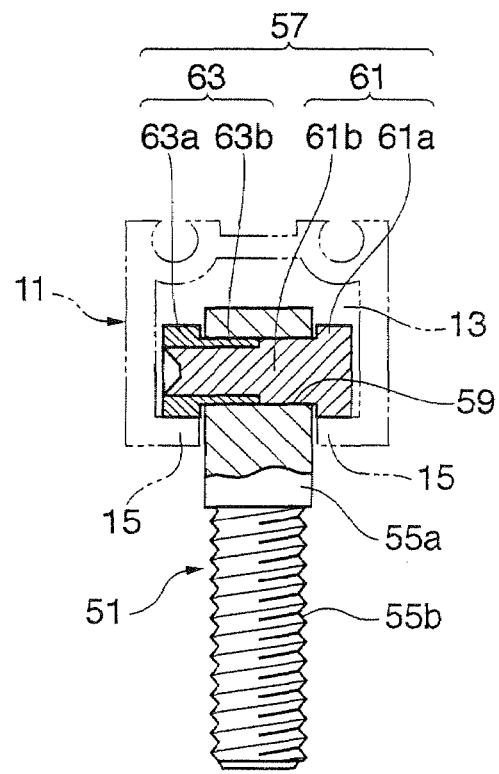

FIG. 3 is a drawing showing a shape of a slider of the T-shape holder, FIG. 3(A) is an elevation drawing of the slider and FIG. 3(B) is a side cross-sectional drawing of the slider.

The T-shape holder 50 comprises a slider 51 slidable along the channel rail 11 and a wire hook (shown as a number 53 in FIG. 1, not shown in FIG. 3) mounted to the slider 51. The slider 51, as shown in FIG. 3(A), is provided with a body 55 and two rollers 57 which are rotatably assembled in the body 55. The body 55 has a sliding portion 55a elongated in a horizontal direction of FIG. 3(A), and a threaded portion 55b extending downwardly from a center of the sliding portion 55a. The threaded portion 55b is threadedly engaged with a wire hook 53 (as shown in FIG. 1) resulting in the wire hook 53 being mounted to the slider 51. The sliding portion 55a is formed on both ends thereof with through-holes 59 for mounting the rollers 57.

As shown in FIG. 3(B), the body 55 has a thickness narrower than a width between each sliding engagement portions 15 of the channel rail 11. And, the roller 57 has a length longer than the width between the sliding engagement portions 15 of the channel rail 11, and narrower than a width of the groove 13 of the channel rail 11.

Each roller 57 is composed of a first roller member 61 and a second roller member 63. Further, the first roller member 61 is provided with a flanged roller portion 61a and an axis portion 61b integrated with the flanged roller portion 61a. And, the axis portion 61b has a larger-diameter part and a smaller-diameter part. The larger-diameter part has a diameter substantially equal to a diameter of the through-hole 59 formed on the sliding portion 55a of the body 55.

On the other hand, the second roller member 63 is provided with a flanged roller portion 63a and a sleeve 63b integrated with the flanged roller portion 63a. The sleeve portion 63b has an outer-diameter substantially equal to the diameter of the through-hole 59 and an inner-diameter substantially equal to a diameter of the smaller-diameter part of the axis portion 61b of the first roller member 61.

In order to assemble the holder 50 by these components, first, the second roller member 63 is coupled with the body 55 by inserting the sleeve portion 63b thereof into the through-hole 59 of the sliding portion 55a of the body 55. Then, the first roller member 61 is coupled with the second roller member 63 coupled with the sliding portion 55a, in a manner that the axis portion 61b thereof is inserted into the sleeve portion 63b of the second roller member 63 through the through-hole 59 of the sliding portion 55a. And, finally, the smaller-diameter part of the axis portion 61b, which projects from the flanged roller portion 63a of the second roller 63, is crushed by using a tool and self-locked to the second roller member 63. Hereby, the both roller members 61, 63 are fixed together to form each roller 57, and the rollers 57 are rotatably assembled to the body 55.

The T-shape wire holder 50 is retained to the channel rail 11 by inserting beforehand the sliding portion 55a of the body 55 into the groove 13 of the channel rail 11 from an end in the length direction thereof. At this time, most of the sliding portion 55a of the body 55 enters into the groove 13 of the channel rail 11 and the threaded portion 55b thereof projects downwardly from the opening between each sliding engagement portions 15 of the channel rail 11. And, the flanged roller portions 61a, 63a of the roller members 61, 63 of each roller 57 run on the sliding engagement portions 15 of the channel rail 11, whereby the holder 50 can slide along the channel rail 11 freely.

As mentioned above, since each roller 57 of the T-shape holder 50 is composed of the roller members 61, 63 each of which the axis portion is integrated with the roller portion, it becomes possible that the slider 51 has a withstanding load about three times as high as that of a conventional holder which is assembled by using an axis and a bearing fixed thereon. And, the T-shape holder 50 has a compact shape, and is preferable for appearance since almost all of the body 55 thereof enters in the groove 13 of the channel rail 11 and is not seen from outside. However, since the holder 50 cannot be attached and detached freely at a desired position along the channel rail 11 as mentioned above, it is required that the holder 50 is retained to the channel rail 11 beforehand. And, the holder 50 cannot be temporarily fixed along the channel rail 11. Accordingly, it may be suitable that the T-shape holder 50 is retained to one rail assembly either the ceiling rail assembly 10 or the floor rail assembly 40 (the ceiling rail assembly 10 in the embodiment), and slide by following another holder which is slidably and detachedly retained to the other rail assembly.

Next, the detachable wire holder 70 will be explained.

Figure 4A:
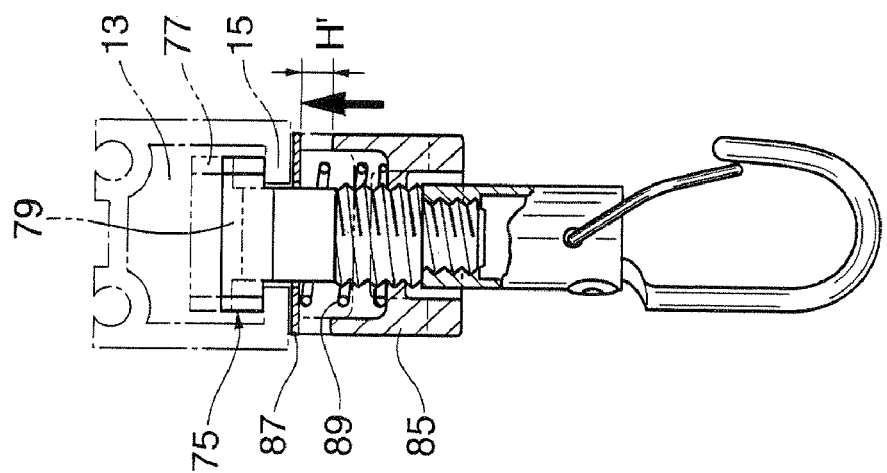
FIG. 4(A) is a cross-sectional drawing showing the wire holder in a lock state.
Figure 4B:
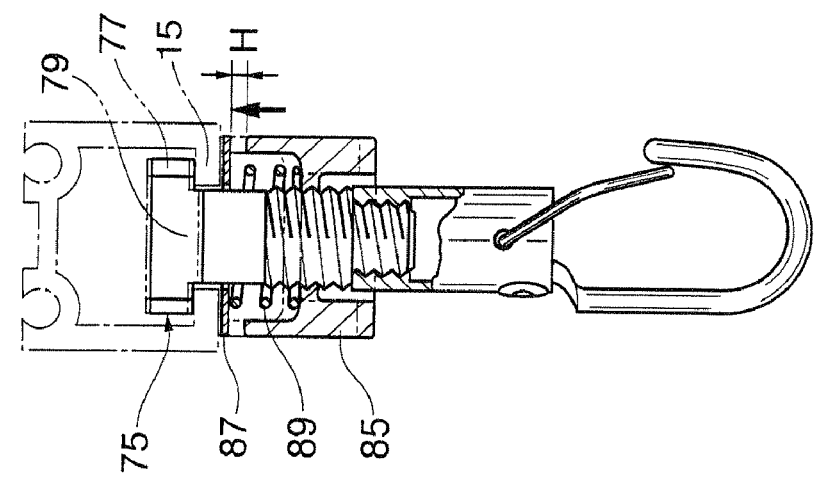
FIG. 4(B) is a cross-sectional drawing showing the wire holder in a slidable state.
Figure 4C:
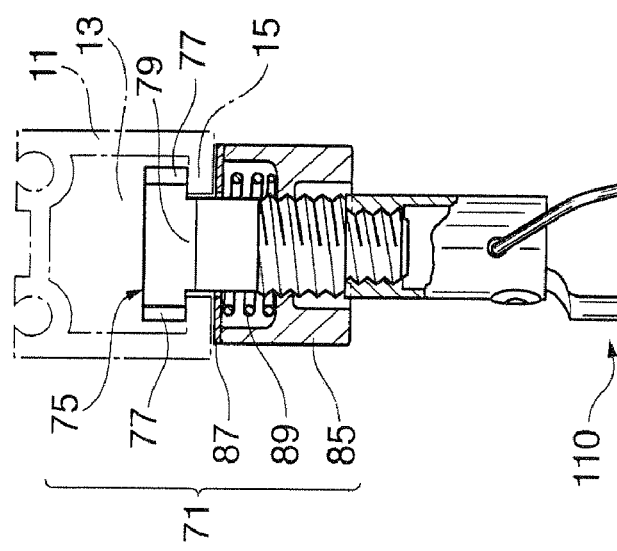
FIG. 4(C) is a cross-sectional drawing showing the wire holder in a detachable state (a rotatable state).

FIG. 4 is a drawing showing a structure of a detachable wire holder, FIG. 4(A) is a cross-sectional drawing showing the wire holder in a lock state, FIG. 4(B) is a cross-sectional drawing showing the wire holder in a slidable state, and FIG. 4(C) is a cross-sectional drawing showing the wire holder in a detachable state.

Figures 5A, 5B, 5C:
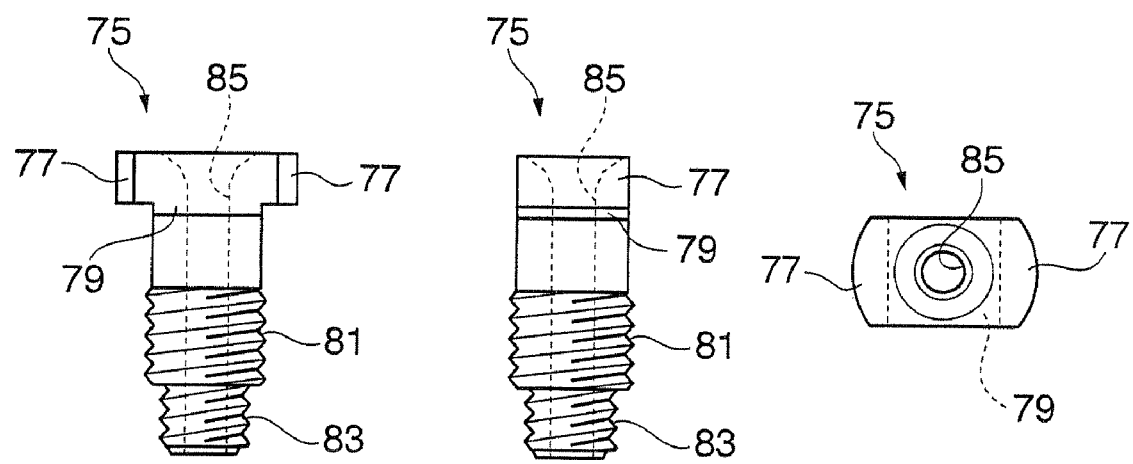
FIG. 5(A) is an elevation drawing of the shaft.
FIG. 5(B) is a side drawing of the shaft and FIG. 5(C) is a plane drawing of the shaft.

FIG. 5 is a drawing showing a structure of a shaft of the wire holder of FIG. 4, FIG. 5(A) is an elevation drawing of the shaft, FIG. 5(B) is a side drawing the shaft and FIG. 5(C) is a plane drawing of the shaft.

In FIG. 4, each drawing is upside down with respect to FIG. 1 for easy understanding.

The wire holder 70 comprises a rail engagement member 71 slidable along the rail and a wire hook 110 to which the wire 100 is hooked. The rail engagement member 71 has a shaft 75, a locknut 85, a washer 87 and a spring 89.

The wire holder 70 is slidably retained to the channel rail 11 and also detachably retained from the channel rail 11 by rotating with respect to the channel rail 11 by a predetermined angle.

Referring to FIG. 5, the shaft 75 is explained.

The shaft 75 has a side view of a T-letter as shown in FIG. 5(A), and provided with a head 77 protruding perpendicular to an axis direction of the shaft 75 on an upper end thereof. The head 77, as shown in FIG. 5(C) showing a plane view thereof, has opposite ends in a longitudinal direction (a length direction) thereof being arcuately curved and opposite sides in a lateral direction (a width direction) thereof being straight and parallel each other. And, the head 77 has a length longer than the width between the sliding engagement portions 15 of the channel rail 11 and substantially equal to the width of the groove 13 of the channel rail 11, and has a width substantially equal to the width between the sliding engagement portions 15 of the channel rail 11. Accordingly, the head 77 is rotatable in the groove 13 of the channel rail 11. When the head 77 is so rotated that the length direction of thereof is aligned perpendicular to the length direction of the groove 13 of the channel rail 11, the wire holder 70 cannot be detached from the channel rail 11 through the opening between the sliding engagement portions 15 of the channel rail 11 because the head 77 is restrained by the sliding engagement portions 15 of the channel rail 11. On the other hand, when the head 77 is so rotated in the groove 13 of the channel rail 11 that the length direction of the head 77 is aligned with the length direction of the groove 13 of the channel rail 11, the wire holder 70 can be detached from the channel rail 11 through the opening between the sliding engagement portions 15 of the channel rail 11 without restrained by the sliding engagement portions 15.

The shaft 75 is further provided with a rotation preventive portion 79 under the head 77. The rotation preventive portion 79 has a plane view of a square, each of the edges of the square having a length substantially equal to the width between the sliding engagement portions 15 of the channel rail 11, and has a certain thickness. And, the rotation preventive portion 79 has opposite sides coincident with the sidewalls of the head 77 in the width direction thereof.

Further, the shaft 75 is provided with a larger-diameter threaded portion 81 and a smaller-diameter threaded portion 83 under the rotation preventive portion 79 in this order. As shown in FIG. 4, the locknut 85 is threadedly engaged with the larger-diameter threaded portion 81. And, the washer 87 and the spring 89 are fitted onto the shaft 75 over the locknut 85 in this order. The spring 89 is fitted onto the shaft 75 between the washer 87 and the locknut 85, and biases the washer 87 toward the head 77 (in the upper direction in the figure) with respect to the locknut 85.

And, the smaller-diameter threaded portion 83 is threadedly engaged with the wire hook 110.

Now, referring to FIG. 4, an operation of the wire holder 70 will be explained, the wire holder 70 assuming a lock state, a slidable state and a detachable state.

First, the lock state as shown in FIG. 4(A) will be explained.

In the lock state, the holder 70 is unslidably and undetachably fixed to the channel rail 11. The head 77 of the holder 70 is inserted into the groove 13 of the channel rail 11, and engaged with the sliding engagement portion 15 of the channel rail 11. At this time, the rotation preventive portion 79 of the holder 70 is positioned between the sliding engagement portions 15 of the channel rail 11. The locknut 85 is threadedly advanced onto the larger-diameter portion 81 toward the head 77 as close as possible. The washer 87 is biased toward the head 77 with respect to the locknut 85 by the spring 89, and pressed toward the head 77 by the locknut 85. As a result, the sliding engagement portion 15 of the channel rail 11 are tightly held between the head 77 and the washer 87 so that the rail engagement member 71 of the holder 70 is unslidably and undetachably fixed to the channel rail 11.

Next, the slidable state as shown in FIG. 4(B) will be explained.

In the slidable state, the holder 70 is slidably but unrotatably attached to the channel rail 11. In other ward, the holder 70 cannot be detached from the channel rail 11. The locknut 85 is threadedly advanced onto the larger-diameter portion 81 away from the head 77 for a predetermined distance, and is biased downwardly with respect to the sliding engagement portion 15 of the channel rail 11 by the spring 89. Hereby, the head 77 is biased downwardly and abuts on the sliding engagement portion 15 of the channel rail 11. At a result, between the washer 87 and an upper end of the locknut 85, a clearance H is formed. In other words, the washer 87 is biased toward the rail engagement portion 15 by only a bias force of the spring 89.

In this state, since the sliding engagement portion 15 of the channel rail 11 is held between the head 77 and the washer 87 by only the bias force of the spring 89, when the holder 70 is forced to be slid along the channel rail 11 by applying a force larger than the bias force of the spring 89, the holder 70 can slide along the channel rail 11. At this time, when the holder 70 will be pressed upwardly against the bias force of the spring 89, a smooth slide of the holder 70 becomes possible.

On the other hand, when the holder 70 will be pressed upwardly against the bias force of the spring 89, the upper end of the locknut 85 abuts on the under surface of the washer 87, as shown in a double-dashed line in the figure. As a result, in the groove 13 of the rail, a clearance having a height equal to that of the clearance H is formed between the head 77 and the sliding engagement portion 15 of the channel rail 11. Since the clearance H has a height (for example, 0.8 mm) smaller than the thickness (for example 1.00 mm) of the rotation preventive portion 79, a whole of the rotation preventive portion 79 cannot enter into the groove 13 of the channel rail 11. So, when the holder 70 will be rotated with respect to the channel rail 11, since the rotation preventive portion 79 is restrained by the sliding engagement portion 15 of the channel rail 11, the holder 70 cannot be rotated with respect to the channel rail 11. That is, the holder 70 cannot be detached from the channel rail 11.

Next, the detachable state as shown in FIG. 4(C) will be explained.

In this state, the holder 70 is rotatably and also detachably attached to the channel rail 11. In the state, the locknut 85 is further threadedly advanced onto the larger-diameter portion 81 away from the head 77 for a longer predetermined distance. The locknut 85 is further biased downwardly with respect to the channel rail engagement portion 15 of the channel rail 11 by the spring 89. As a result, a larger clearance H' is formed between the washer 87 and the locknut 85.

When the holder 70 will be pressed upwardly against the bias force of the spring 89, the locknut 85 abuts on the under surface of the washer 87, as shown in a double-dashed line in the figure. As a result, in the groove 13 of the channel rail 11, a larger clearance having a height equal to that of the clearance H' (the height H' is larger than the height H shown in FIG. 4(B), for example 1.2 mm) is formed between the head 77 and the sliding engagement portion 15 of the channel rail 11. Hereby, the whole of the rotation preventive portion 79 can enter into the groove 13 of the channel rail 11 and be rotated therein. Accordingly, when the holder 70 will be rotated with respect to the channel rail 11, the rotation preventive portion 79 (that is the holder 70) can be rotated in the groove 13 of the channel rail 11 without being restrained by the sliding engagement portion 15 of the channel rail 11. Then, when the holder 70 will be rotated with respect to the channel rail 11 by substantially 90°, since the length direction of the head 77 aligns with the length direction of the groove 13 of the channel rail 11, the head 77 of the holder 70 can be detached from the channel rail 11 through the space between the sliding engagement portions 15 of the channel rail 11.

As explained above, the detachable wire holder 70 can be detachably attached at a desired position along the channel rail 11. For change of the attachment position of the holder 70, firstly, the holder 70 is made to be the slidable state and then slid to a desired position along the channel rail 11. And, next, it is made to be the lock state and then fixed to the position temporarily. Accordingly, when the wire holder 70 and the T-shape holder 50 are retained to the floor rail assembly 40 and the ceiling rail assembly 10 respectively, it will be possible that both ends of the wire are located at a same location in the X-direction.

Next, the wire hook 110 will be explained.

The wire hook 110 is mounted to the detachable wire holder 70, and is for hooking the wire so as not to slip the wire 100 from the wire holder 70.

Figures 6A, 6B:
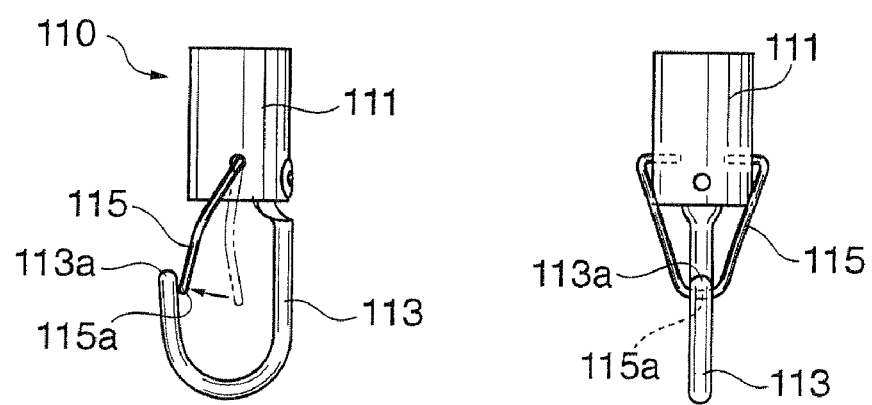
FIG. 6(A) is an elevation drawing of the wire hook and FIG. 6(B) is a side drawing of the wire hook.

FIG. 6 is a drawing showing the wire hook, FIG. 6(A) is an elevation drawing of the wire hook and FIG. 6(B) is a side drawing of the wire hook.

The wire hook 110 is provided with a sleeve member 111, a hook member 113 from which the wire 100 is hooked and a slipping preventive member 115. The sleeve member 111 is formed on an upper end thereof with an inner thread, with which the smaller-diameter portion 83 of the wire holder 70 is threadedly engaged, resulting in the wire hook 110 being mounted to the wire holder 70. The hook member 113 is mounted to the lower end of the sleeve member 111.

As shown in FIG. 6(B), the slipping preventive member 115 is made by folding an elongate stainless steel wire into substantially a V-letter and inserting both ends of the wire into holes formed at a cylindrical periphery of the sleeve member 111. A pointed end 115a of the slipping preventive member 115 is contacted with a distal end 113a of the hook member 113 from inside of the hook member 113. Hereby, a space between the distal end 113a of the hook member 113 and the cylindrical periphery of the sleeve member 111 is closed.

When the slipping preventive member 115 is pressed inwardly until a position as shown in a dashed-line in FIG. 6(A), the space between the distal end 113a of the hook member 113 and the cylindrical periphery of the sleeve member 111 is opened. And, when slipping preventive member 115 is further pressed inwardly, the both ends of the slipping preventive member 115 are spread outwardly by the cylindrical periphery of the sleeve member 111. Then, when the force by which the slipping preventive member 115 is pressed inwardly is released, the slipping preventive member 115 is biased by the cylindrical periphery of the sleeve member 111 as shown in an arrow in FIG. 6(A), and is returned to its original position, in which the pointed end 115a of the slipping preventive member 115 contacts with the distal end 113a of the hook member 113. Hereby, the space between the distal end 113a of the hook member 113 and the cylindrical periphery of the sleeve member 111 is closed.

As mentioned above, in the wire hook 110, the space between the distal end 113a of the hook member 113 and the cylindrical periphery of the sleeve member 111 can be closed by a simple action such that the slipping preventive member 115 is biased outwardly by the cylindrical periphery of the sleeve member 111.

Next, the wire 100 will be explained.

For the wire 100, a stranded wire which a plurality of stainless wires is stranded may be used. In the embodiment, an upper end of the wire 100 is detachably held to the wire hook 53 of the T-shape wire holder 50 which is slidably mounted to the channel rail 11. The wire 100 is formed on a lower end thereof with a ring, to which the wire hook 110 of the detachable wire holder 70 is hooked.

At the middle of the wire 100, the antitheft wire gripper 120 is mounted. The antitheft wire gripper 120 can slide along the wire 100, and be temporarily fixed at a desired position (height).

Next, the antitheft wire gripper 120 will be explained.

The antitheft wire gripper 120, to which various article such as a goods exhibited in a shop, a hanger and a shelf is hung, can be fixably attached at a desired position (height) along the wire 100, and also can prevent the article hung thereby from being stolen.

Figure 7A:
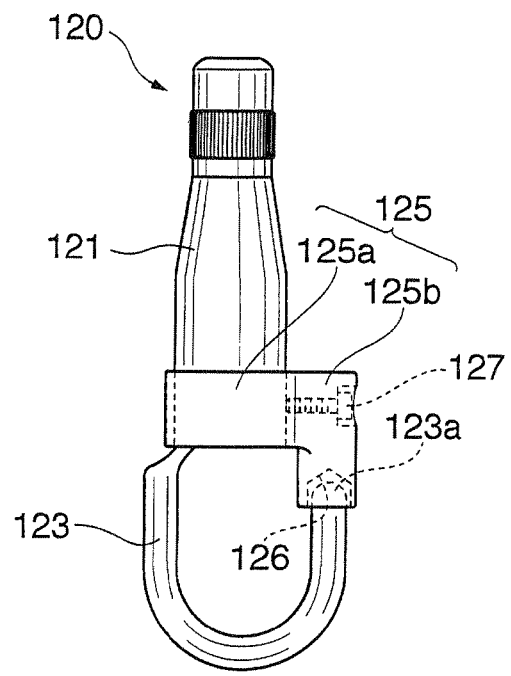
FIG. 7(A) is an elevation drawing of the wire gripper view and FIG. 7(B) is a side drawing of the wire gripper.
Figure 7B:
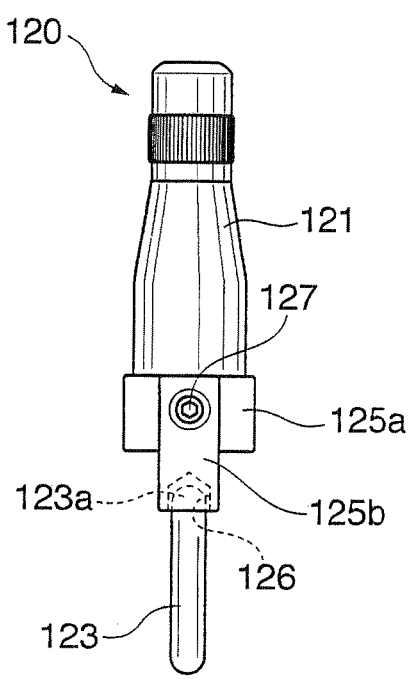

FIG. 7 is a drawing showing the antitheft wire gripper, FIG. 7(A) is an elevation drawing of the wire gripper view and FIG. 7(B) is a side drawing of the wire gripper.

The antitheft wire gripper 120 comprises a gripper sleeve 121, a hook 123 and a hook cover 125. The gripper sleeve 121 has a grip mechanism capable of being fixably attached at a desired position along the wire 100. For the grip mechanism, a well-know mechanism (for example, Japanese Laid-Open Patent number hei 11-113702) may be used.

The hook cover 125 is so served that a space between a distal end 123a of the hook 123 and an outer surface of the gripper sleeve 121 is closed, and has a sliding portion 125a slidable along the gripper sleeve 121 and a cover portion 125b. The cover portion 125b is formed on a distal end thereof with a hole 126. When the sliding portion 125a is slid onto the gripper sleeve 121 downwardly and upwardly, the space between the distal end 123a of the hook 123 and the outer surface of the gripper sleeve 121 is opened and closed, with the distal end 123a of the hook 123 coming in and out of the hole 126 of the cover portion 125b. The sliding portion 125a can be temporarily fixed to the gripper sleeve 121 by a set-screw 127.

In a state as shown in FIG. 7, after the set-screw 127 is loosened, the sliding portion 125a is slid upwardly onto the gripper sleeve 121, resulting in the space for hooking the article to the hook 123 being opened between the distal end 123a of the hook 123 and the gripper sleeve 121. Then, the sliding portion 125a is slid downwardly onto the gripper sleeve 121 with the distal end 123a of the hook 123 being entered into the hole 126 of the cover portion 125b, and then the set-screw 127 is tightened using a specified tool which is accommodated to the set-screw 127, resulting in the hook cover 125 being temporarily fixed to the gripper sleeve 121.

As mentioned above, since a specified tool (for example, a hexagon wrench) which is accommodated to the set-screw 127 is required for sliding the hook cover 125 with respect to the gripper sleeve 121 in order to open the space between the distal end 123a of the hook 123 and the gripper sleeve 121, the article is not allowed to be stolen from the gripper 120 easily.

Next, the rotatable gripper will be explained. The rotatable gripper, from which various articles are hanged, is fixably attached at a desired position (height) along the wire 100. The article is hung to the rotatable gripper 140 so as to be rotated with respect to the rail freely.

Figure 8:
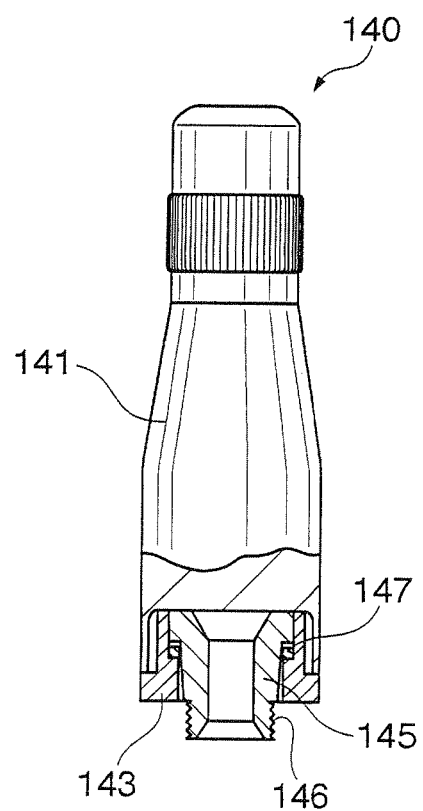
FIG. 8 is a partial cross-sectional drawing showing a structure of the rotatable gripper.

FIG. 8 is a partial cross-sectional drawing showing a structure of the rotatable gripper.

The rotatable gripper 140 comprises a gripper sleeve 141 and a hook (not shown) to which an article is hooked. The gripper sleeve 141 has a grip mechanism capable of being fixably attached at a desired position along the wire 100. For the grip mechanism, a well-known mechanism may be used.

The gripper sleeve 141 is provided with an outer ring 143 and an inner ring 145 which is fit into the outer ring 143. Both rings are fit into a lower end of the gripper sleeve 141, and the outer ring 143 is fixed to the gripper sleeve 141 by a pin. The outer ring 143 is formed on an inner surface thereof with a step. The inner ring 145 is formed on an upper end thereof with a flange extending outwardly, and on a lower end with a threaded portion 146. The inner ring 145 is fit into the outer ring 143 in a manner that the threaded portion 146 thereof is projected from the lower end of the outer ring 143. The threaded portion 146 is threadedly engaged with an inner thread formed on a wire hook (for example, the wire hook as shown in FIG. 6) resulting in the gripper 140 is coupled to the wire hook.

The gripper sleeve 141 is further provided with a bush 147 disposed between the step of the outer ring 143 and the flange of the inner ring 145, and is made of a low-frictional material such as a fluoro-plastic.

Hereby, the inner ring 145 is held to the outer ring 143 so as to be rotated with respect to the outer ring 143. Therefore, the hook engaged with the inner ring 145 can be rotated with respect to the gripper sleeve 141 fixed to the outer ring 143. That is, an article which is hung by the hook can be rotated with respect to the gripper sleeve 141 (the wire) freely. In the case that the article is heavy and a load applied to the gripper is high, the gripper 140 can hold the article stably if the hook will be rotated with respect to the gripper sleeve 141.

Referring to FIG. 1 again, one embodiment for changing an exhibit position of an article which is hung from the wire gripper 120 in the article hanging system 1 will be explained.

In order to change an exhibit position in the X-direction, the detachable wire holder 70 to which the wire 100 is held at the lower end thereof is made to be in the slidable state, and then, is slid to a desired position along the lateral channel rail 11X of the floor rail assembly 40. Herewith, the T-shape wire holder 50 to which the wire 100 is held at the upper end thereof is slid along the channel rail 11 of the ceiling rail assembly 10 by following the wire holder 70.

In order to change an exhibit position in the Y-direction, the cannel rail 11 is slid to a desired position along the double-channel rails 21. At the same time, the channel rail 11X of the floor rail assembly 40 is slid to a desired position along the channel rails 11Y.

In order to change an exhibit position in the Z-direction, the wire gripper 120 is made to be the slidable state, and is slid to a desired position (height) along the wire 100. Then, the gripper 120 is made to be the lock state and temporarily fixed to the desired position.

While the wire 100 is slid along the floor rail assembly 40 at the lower end thereof in this present embodiment, the wire 100 may be hung from the ceiling rail assembly 10 without the lower end of the wire 100 being restrained.

Next, another embodiment of an article hanging system according to the present invention is explained.

FIG. 9 is a drawing showing another embodiment of an article hanging system according to the present invention, FIG. 9(A) is a cross-sectional side drawing of the article hanging system and FIG. 9(B) is an elevation drawing of the article hanging system.

The article hanging system 201 according to this embodiment comprises a rail 210 installed on a wall W, a wire holder 240 capable of sliding along the rail 210, a wire 260 held to the wire holder 240, and a gripper 270 for hanging the article at a desired position along the wire 260.

First, a structure of the rail 210 will be explained.

Figure 10A:
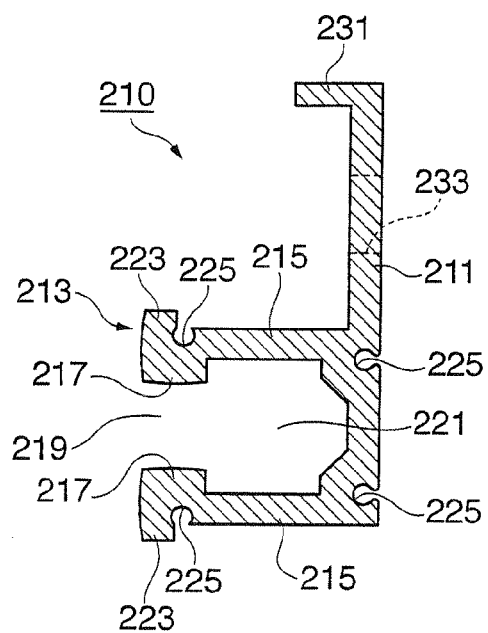
FIG. 10(A) is a cross-sectional side drawing of the rail body and FIG. 10(B) is a cross-sectional side drawing showing an appearance which the rail is installed on the wall.
Figure 10B:
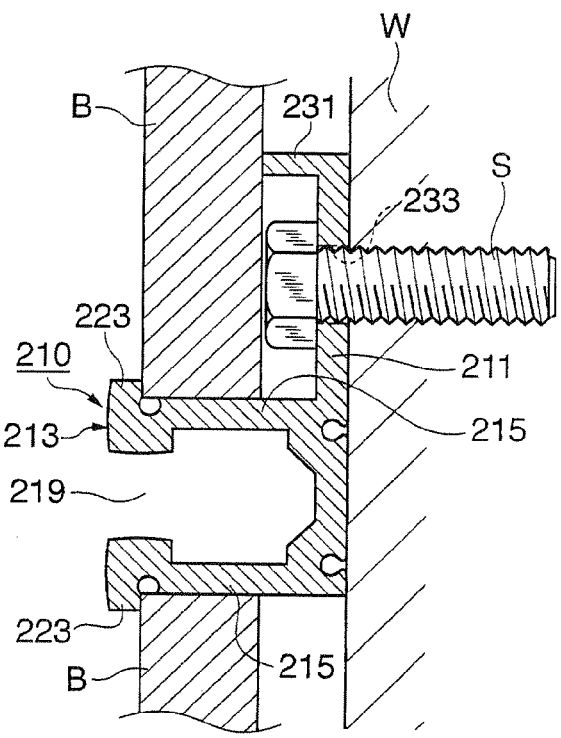

FIG. 10 is a drawing showing the structure of the rail of the article hanging system of FIG. 9, FIG. 10(A) is a cross-sectional side drawing of the rail body and FIG. 10(B) is a cross-sectional side drawing showing an appearance which the rail is installed on the wall.

The rail 210 has a long back plate 211, with a rail channel 213 extending in a length direction of the rail 210, the rail channel 213 being formed on a lower half-face of the back plate 211. The rail channel 213 has an inner groove 221 formed by the back plate 211 and two sidewalls 215 perpendicular to the back plate 211. The sidewalls 215 are formed on edges thereof with inside engagement portions 217, which projects to opposite directions each other. Between the both inside engagement portions 217, an opening 219 is opened. The inner groove 221 has a cross section of a substantially square. The sidewalls 215 are formed on edges thereof with outside engagement portions 223 projecting to opposite directions.

Additionally, the rail cannel 213 has some grooves 225 extending to the length direction of the rail 210 and having a cross section of a substantially circle. When the rails 210 will be adjoined, connecting bars are fitted into the grooves 225 so that the rails 210 can be adjoined straightly.

And, the back plate 211 is formed on an upper half-plane in the width direction thereof with holes 233 at predetermined intervals, and with a wall panel engagement portion 231 perpendicular to the back plate 211.

Referring to the FIG. 10(B), an installing process of the rail 210 on the wall will be explained.

First, the back plate 211 of the rail 210 is arranged horizontally on the wall at a predetermined height with the rail cannel 213 thereof being lower-side, and then bolts S are passed through the hole 233 of the back plate 211 and screwed to the wall W. Hereby, the rail 210 is mounted on the wall W, with the opening 219 of the rail channel 213 being opened in a horizontal direction. Next, a plaster board B is set on the upper sidewall 215 of the rail channel 213, and held between the outside engagement portion 223 of the upper sidewall 215 and the wall panel engagement portion 231. Then, the plaster board B is fixed to the wall by a well-known way. Then, another plaster board B is set under the lower sidewall 215 and engaged with the outside engagement portion 223 of the lower sidewall 215, and then fixed to the wall by a well-known way.

Next, the wire holder 240 will be explained.

Figure 11A:
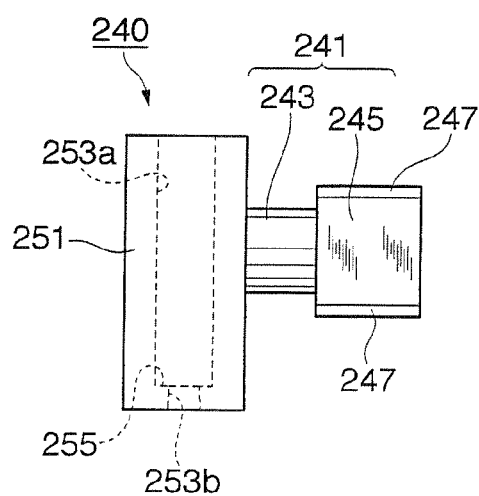
FIG. 11(A) is a side drawing of the wire holder and FIG. 11(B) is an elevation drawing of the wire holder.
Figure 11B:
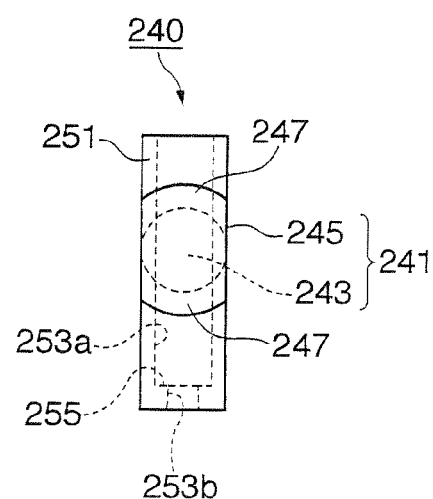

FIG. 11 is a drawing showing a structure of the wire holder, FIG. 11(A) is a side drawing of the wire holder and FIG. 11(B) is an elevation drawing of the wire holder.

The wire holder 240 is provided with a slider 241 retained in the rail channel 213 of the rail 210, and a wire hook 251 for hooking the wire.

The wire hook 251 has a through-hole 253 extending to a longitudinal direction thereof (in a gravitational direction). The through-hole 253 is for passing the wire 260 through, and has a larger-diameter threaded portion 253a, a smaller-diameter portion 253b and a step 255 between the larger-diameter portion 253a and the smaller-diameter portion 253b.

As shown in FIG. 9, the wire 260 has a lock portion 261 of a diameter larger than a diameter of the wire 260 at one end thereof. The wire 260 is held to the wire hook 251 by engagement of the lock portion 261 of the wire 260 with the step 255 of the wire hook 251. The wire gripper 270 having a hook 271 (an article engagement portion) is attachable to a desired position along the wire 260 passed from the wire holder 240. For such wire gripper 270, a well-known wire gripper (for example, the wire gripper as shown in FIG. 7) may be used.

Referring to the FIG. 11 again, the wire holder 240 will be explained.

As mentioned above, the wire holder 240 is provided with a slider 241 which protrudes from a side surface of the wire hook 251. The slider 241 has a shaft portion 243 protruding in a horizontal direction from the side surface of the wire hook 251, and a sliding portion 245 at a distal end of the shaft portion 243. The sliding portion 245 is extending in a longitudinal direction (a gravitational direction), and, as shown in FIG. 11(B), has opposite ends 247 in the longitudinal direction (a length direction) thereof being arcuately curved, and opposite sides in the lateral direction (a width direction) thereof being straight and parallel. The sliding portion 245 has a length slightly smaller than a width of the inner groove 221 of the rail channel 213 (a distance between both sidewalls 215), with the each curved end 247 thereof having a curvature slightly smaller than a curvature of a circle which has a diameter substantially equal to the width of the inner groove 221. And, the sliding portion 245 has a width substantially equal to the width of the opening 219 of the rail channel 213 (a distance between the both inside engagement portions 217).

In addition, the sliding portion 245 has a thickness substantially equal to a depth of the inner groove 221.

The shaft portion 243 is column-shaped, and has a diameter slightly smaller than the width of the opening 219 of the rail channel 213 (a distance between the both inside engagement portions 217) and a length substantially equal to the thickness of the inside engagement portions 217 of the rail channel 213.

Referring to FIG. 9, an attachment and detachment process of the wire holder 240 to the rail 210 will be explained.

In order to attach the wire holder 240 to the rail 210, first, the length direction of the sliding portion 245 is aligned with a length direction of the opening 219 of the rail channel 213, and then, the sliding portion 245 is passed through the opening 219. Since the width of the sliding portion 245 and the diameter of the shaft portion 243 are substantially equal to the width of the opening 219, the sliding portion 245 can enter into the inner groove 221 through the opening 219 of the rail channel 213. After whole of the sliding portion 245 enters into the inner groove 221, as shown in an arrow in FIG. 9(B), the sliding portion 245 will be rotated by 90°. At this time, since the sliding portion 245 has the diameter slightly shorter than the width of the inner groove 221, the sliding portion 245 can be rotated therein. In addition, since the shaft portion 243 has a diameter substantially equal to the width of the opening 219, the shaft portion 243 can also be rotated therein.

After the sliding portion 245 is rotated by 90° as shown in FIG. 9(A), since the curved ends 247 are engaged with the inside engagement portions 217 of the rail channel 213, the sliding portion 245 cannot be detached from the inner groove 221 through the opening 219. And, the sliding portion 245 is slidably retained in the inner groove 221 of the rail channel 213 while the curved ends 247 thereof being contacted with the sidewalls 215 of the rail channel 213, whereby smooth sliding of the slider 241 becomes possible.

Here, the sliding portion 245 is extending to the gravitational direction after rotating by 90°. In other word, the sliding portion 245 is extending in the gravitational direction when the wire hook 251 is extending to the gravitational direction by straining the wire 260 in the gravitationally direction due to a weight of an article hung to the wire gripper 270. Accordingly, an article hung by the gripper 270 allows the wire holder 240 to be undetachably attached to the rail 210.

In addition, since the shaft portion 243 has the length substantially equal to the thickness of the inside engagement portion 217, the wire holder 240 is prevented from being swung to a depth direction of the rail channel 213.

Accordingly, the sliding portion 245 can come in and out of the inner groove 221 of the rail channel 213 by aligning the length direction thereof with the length direction of the opening 219 of the rail channel 213. And, after coming the sliding portion 245 in the inner groove 221, the wire holder 240 is so rotated that the length direction thereof is aligned with the length direction of the opening 219, whereby the wire holder 240 becomes undetachable from the rail 210.

As mentioned above, the sliding portion 245 and the shaft portion 243 of the wire holder 240 are rotatably retained in the inner groove 221 and opening 219 of the rail channel 213.

Therefore, when the wire holder 240 will be slid along the rail 210 by pulling a lower end of the wire 260, the slider 241 can slide along the rail as being tilted with respect to the rail 210.

Figure 12:
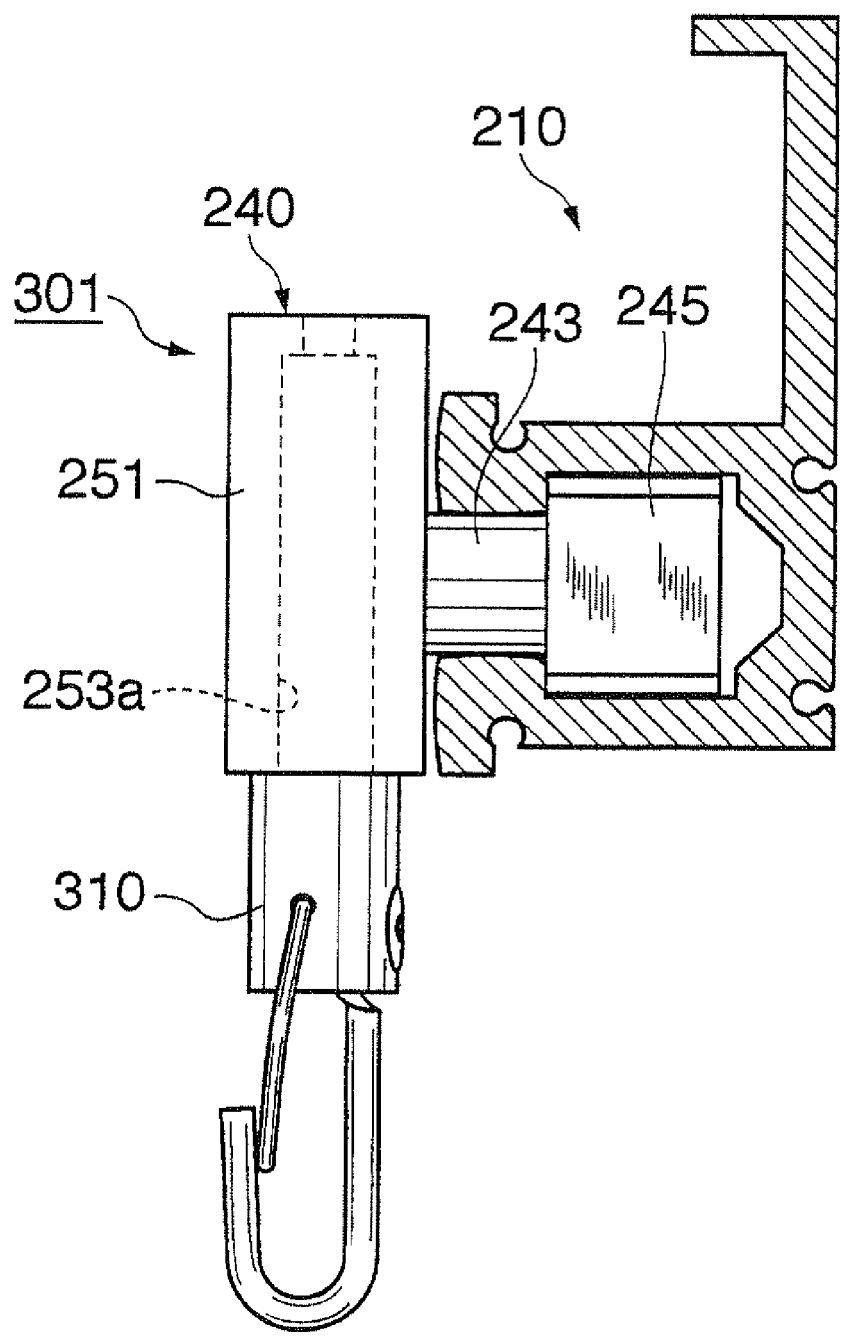
FIG. 12 is a drawing showing another embodiment of the article hanging system according to the present invention.

FIG. 12 is a drawing showing another embodiment of the article hanging system according to the present invention.

The article hanging system 301 in the embodiment comprises the rail 210 as shown in FIG. 10, the wire holder 240 as shown in FIG. 11, and a hook 310. In this embodiment, the wire holder 240 is retained to the rail 210 upside down. And, the hook 310 is directly attached to the wire holder 240 by threadedly engaging with the larger-diameter threaded portion 253a of the wire holder 240. An article is hung by the hook 310.

Another embodiments of a way for attachment of the rail 210 shown in FIG. 10(A) to a wall will be explained.

Figure 13:
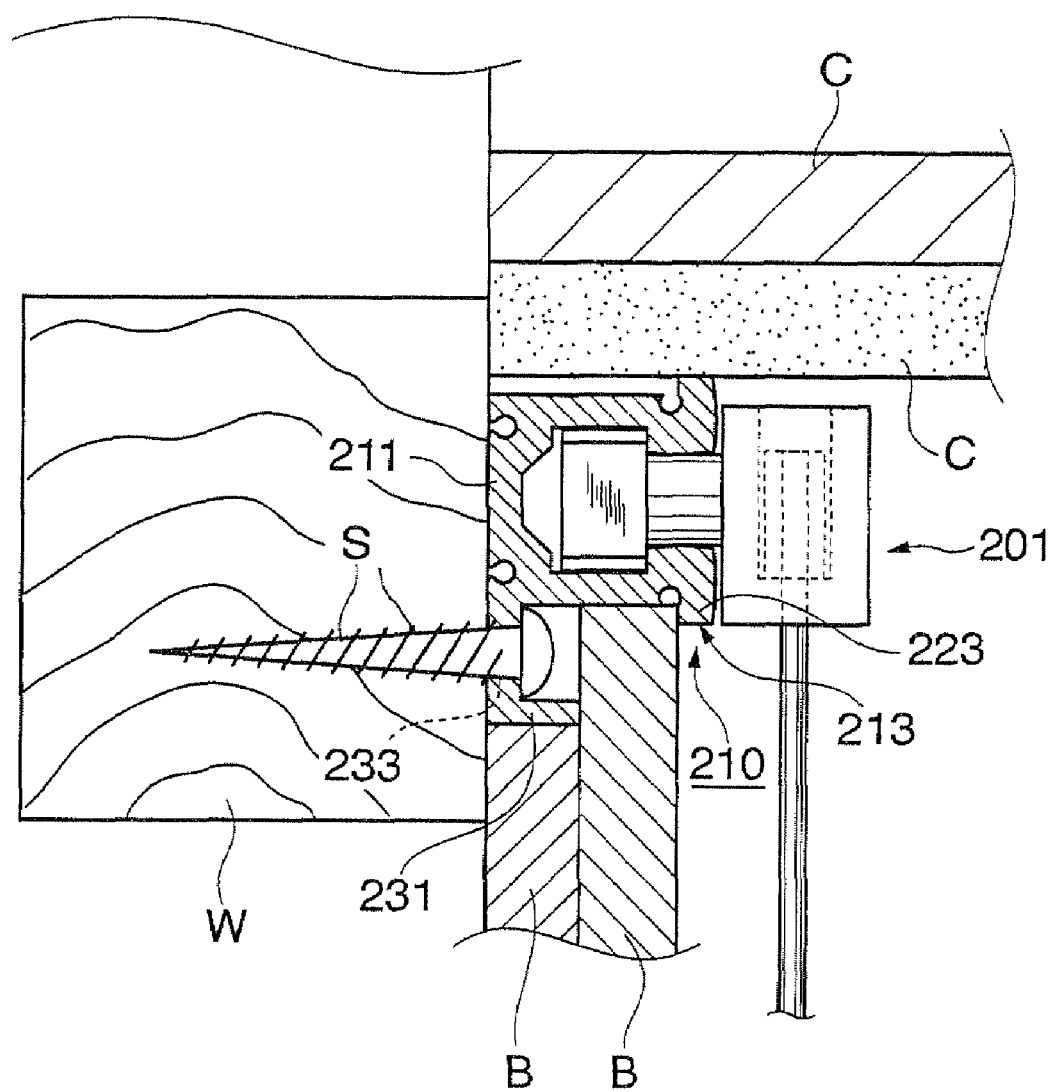
FIG. 13 is a drawing showing an appearance which the rail shown in FIG. 10(A) is installed on a wall.
Figure 14:
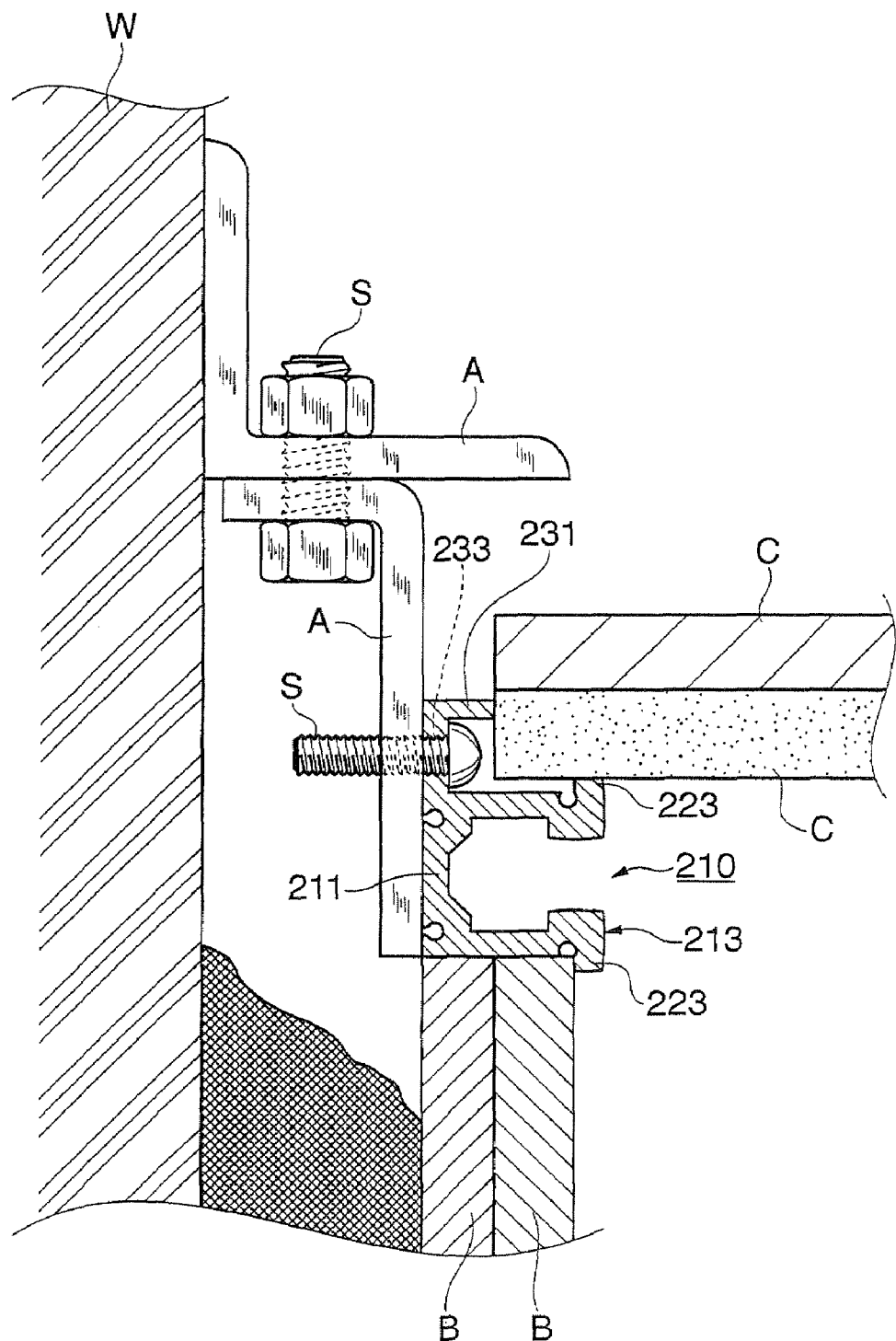
FIG. 14 is a drawing showing an appearance which the rail shown in FIG. 10(A) is installed on a wall.
Figure 15:
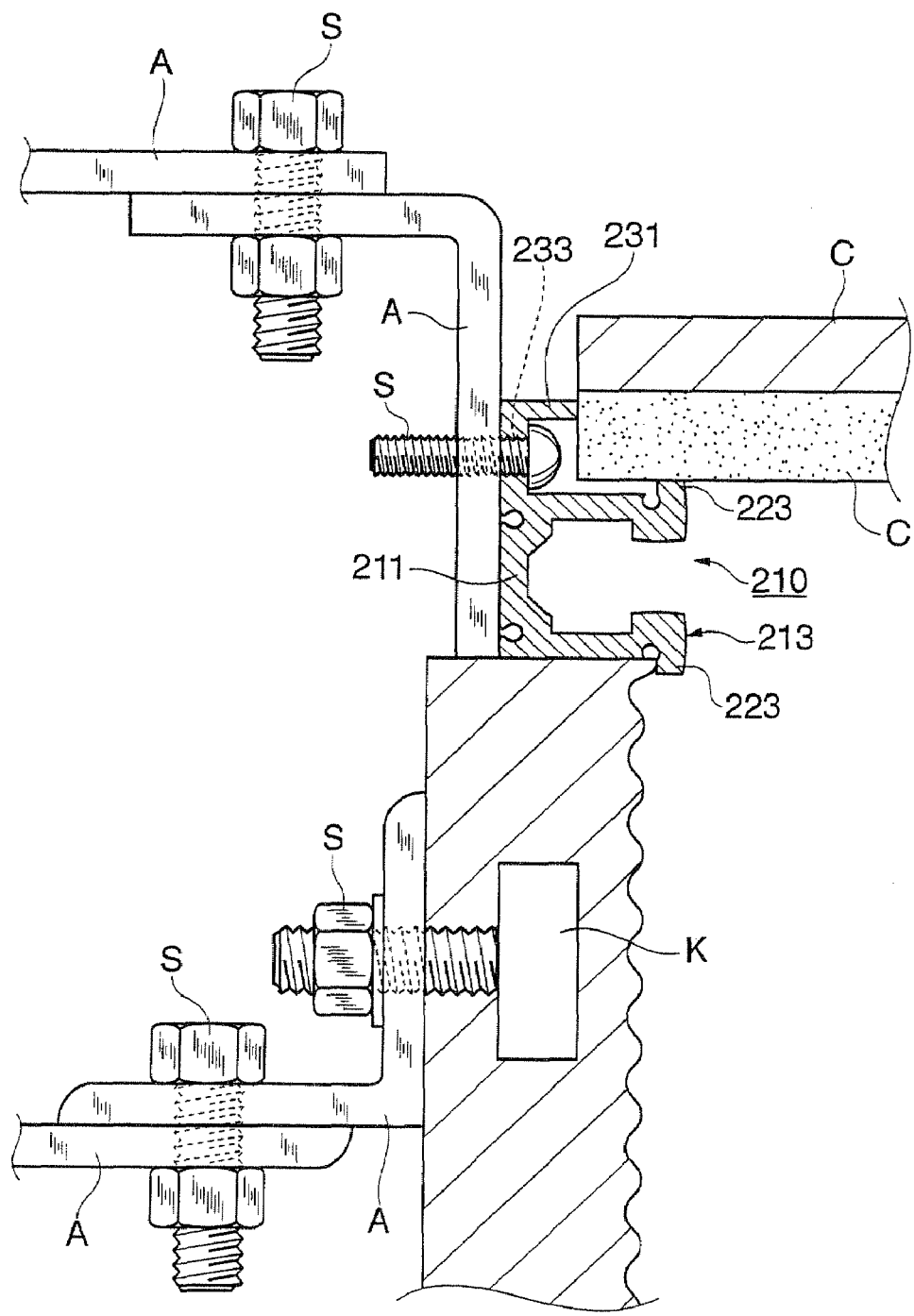
FIG. 15 is a drawing showing an appearance which the rail shown in FIG. 10(A) is installed on a wall.

FIG. 13 to FIG. 15 are drawings each showing an appearance which the rail shown in FIG. 10(A) is installed on a wall.

FIG. 13 shows an embodiment which the rail is installed on an upper end of the wall beforehand.

The rail 210 is arranged to a corner between a ceiling C and a woody substrate W, with the rail channel 213 thereof being lower-side. The back plate 211 of the rail 210 is fixed to the woody substrate W by a screw S. Two plaster boards B are laid under the lower sidewall 215 of the rail channel 213. The front plaster boards B is held between the outside engagement portion 223 of the rail channel 213 and the wall panel engagement portion 231, and the back plaster board B is held between the woody substrate W and the front plaster board B.

FIG. 14 shows another embodiment which the rail is installed on an upper end of the wall beforehand.

In the embodiment, the rail 210 is fixed to an angle bracket A by a bolt S with the rail channel 213 thereof being lower-side. The angle bracket A is coupled to another angle bracket A by a bolt S, the later angle bracket A being fixed by welding to a concrete building frame W. Two ceiling boards C are fixed to a beam of the ceiling while being held by the upper outside engagement portion 223 of the upper sidewall 215 and the wall panel engagement portion 231. Two plaster boards B are laid under the lower outside engagement portion 223 of the rail 210 with being engaged with the outside engagement portion 223 of the lower sidewall 215. Between the plaster board B and the building frame W, plaster is filled.

FIG. 15 shows another embodiment which the rail is installed on an upper end of the wall beforehand.

In the embodiment, the rail 210 is fixed to an angle bracket A by a bolt S with the rail channel 213 thereof being lower-side. The angle bracket A is coupled to another angle bracket A by a bolt S, the later angle bracket A being fixed by welding to a concrete building frame. Two ceiling boards C are fixed to a beam of the ceiling with being held by the upper outside engagement portion 223 of the upper sidewall 215 and the wall panel engagement portion 231. A marble board is lied under the lower sidewall 215 of the rail channel 213 with being engaged with the lower outside engagement portion 223 of the lower sidewall 215, and fixed to an angle bracket A. The angle bracket A is coupled to another angle bracket A, the later angle bracket A being fixed by welding to a concrete building frame, by using a bolt S and anchor K.

Figure 16:
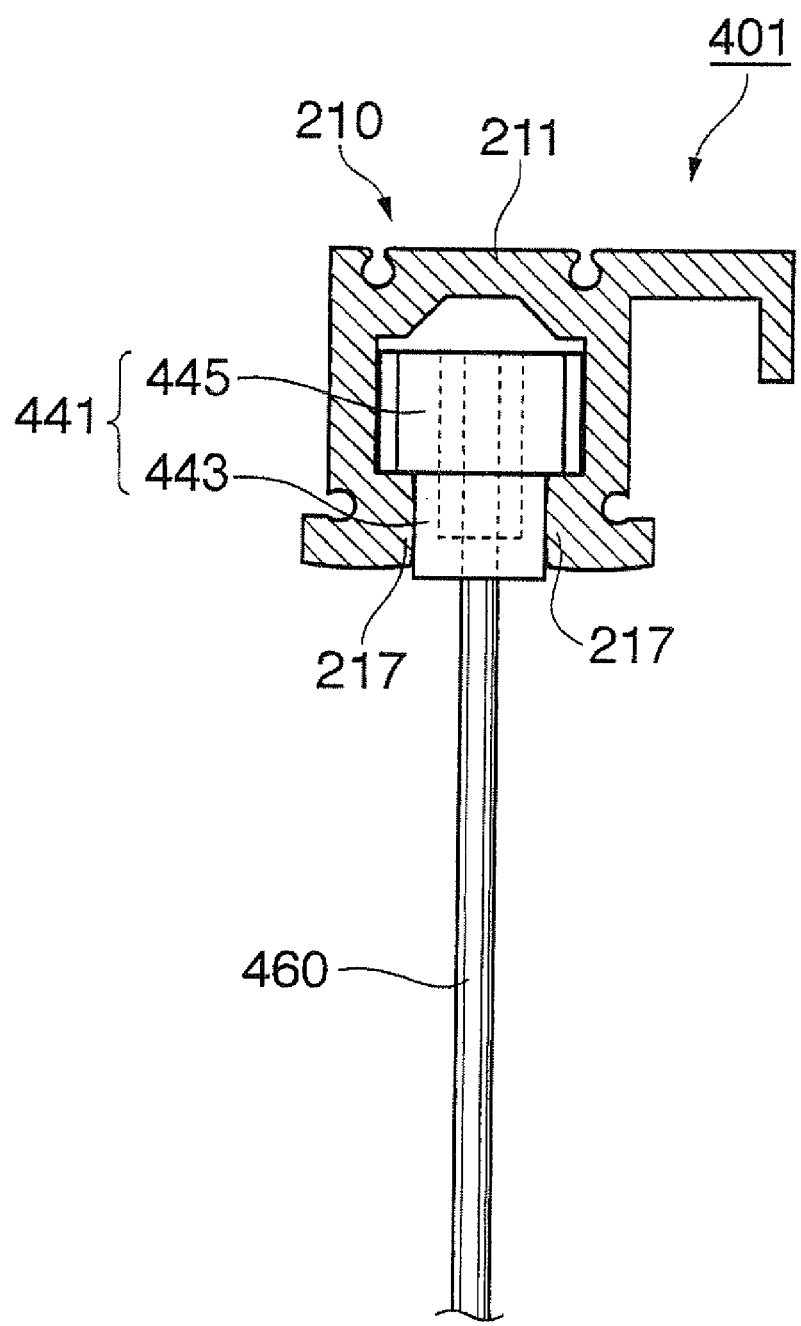
FIG. 16 is a drawing showing another embodiment of an article hanging system according to the present invention.

FIG. 16 is a drawing showing another embodiment of an article hanging system according to the present invention.

The article hanging system 401 in this embodiment is for installing the rail 210 on a ceiling C. The system 401 comprises the rail 210 installed on the ceiling C, a slider 441 capable of sliding along the rail 210, a wire 460 held to the slider 441 and a gripper (not shown) for hanging an article at a desired position along the wire.

For the rail 210, the rail as shown in FIG. 10 may be used. In this embodiment, the rail 210 is installed on ceiling by fixing the back plate 211 thereof to the ceiling by a bolt.

The slider 441 has a sliding portion 445 and a shaft portion 443, each portion having a same shape as the sliding portion 245 and the shaft portion 243 of the slider 241, as shown FIG. 11, respectively. The slider 441 has a through hole through which the wire 460 is passed, the through hole extending to the length direction thereof. The through hole has a larger diameter threaded hole, a smaller-diameter hole and a step between the both holes.

The wire 460 has a locking portion having a diameter larger than a diameter of the wire 460. The wire 460 is held to the slider 441 by engaging the locking portion thereof with the step of the through hole.

The slider 441 has a same attachment and detachment manner as that of the slider 241 as shown in FIG. 11.

What is claimed is:

1. A wire gripper comprising:
   a gripper sleeve having a gripping mechanism which is fixably attachable at a desired position along a wire;
   a hook which is adapted to hook an article, and which is coupled to said gripper sleeve; and
   a hook cover which is slidable with respect to the gripper sleeve along a longitudinal direction of the wire and the gripper sleeve to open and close an opening of said hook, and which is adapted to be locked to said gripper sleeve;
   wherein a tool is required at least to unlock the hook cover to enable sliding of the hook cover with respect to the gripper sleeve to open the opening of the hook;
   wherein the opening of the hook is between a distal end of the hook and an outer surface of the gripper sleeve; and
   wherein the hook cover comprises a sliding portion which is slidably coupled to the gripper sleeve and a cover portion which comprises a hole to receive the distal end of the hook.

2. The wire gripper according to claim 1, wherein the tool is required to lock the hook cover to the gripper sleeve.

3. The wire gripper according to claim 1, wherein the hook cover is adapted to be locked to the gripper sleeve by a set-screw which extends through said hook cover and which is tightened against the gripper sleeve to lock the hook cover to the gripper sleeve.

4. The wire gripper according to claim 3, wherein the tool is required to tighten and to loosen the set screw to lock and unlock the hook cover with respect to the gripper sleeve.

5. The wire gripper according to claim 4, wherein the tool is a hexagon wrench.

6. The wire gripper according to claim 1, wherein the tool is a hexagon wrench.

* * * * *